United States Patent [19]
Focke et al.

[11] Patent Number: 5,562,393
[45] Date of Patent: Oct. 8, 1996

[54] HANDLING APPARATUS HAVING A RETRACTABLE AND EXTENDABLE TELESCOPIC PART

[75] Inventors: Heinz Focke, Verden; Pavel Livotov, Hanover, both of Germany

[73] Assignee: Focke & Co. (GmbH & Co.), Verden, Germany

[21] Appl. No.: 299,488

[22] Filed: Sep. 1, 1994

[30] Foreign Application Priority Data

Sep. 6, 1993 [DE] Germany ............... 43 30 134.7

[51] Int. Cl.$^6$ ........................................ B25J 18/02
[52] U.S. Cl. ................. 414/626; 414/910; 901/21; 901/22
[58] Field of Search ...................... 414/561, 626, 414/684, 728, 729, 910; 901/21–22, 28–29; 74/490.01, 490.02, 490.04, 490.05, 490.06; 92/177

[56] References Cited

U.S. PATENT DOCUMENTS

| | | |
|---|---|---|
| 1,868,117 | 7/1932 | Pancoast . |
| 3,180,236 | 4/1965 | Beckett ......................... 92/177 |
| 4,547,119 | 10/1985 | Chance et al. ............. 901/21 X |
| 4,566,843 | 1/1986 | Iwatsuka et al. ........... 901/21 X |
| 4,573,856 | 3/1986 | Meyer et al. ................ 414/561 |
| 4,604,026 | 8/1986 | Barrett ........................ 414/728 |
| 4,637,773 | 1/1987 | Nakashima et al. ...... 901/21 X |
| 5,020,323 | 6/1991 | Hürlimann ............... 414/728 X |
| 5,116,190 | 5/1992 | Silke ........................ 414/626 X |
| 5,451,134 | 9/1995 | Bryfogle ............. 74/490.05 X |

FOREIGN PATENT DOCUMENTS

| | | |
|---|---|---|
| 16921 | 10/1980 | European Pat. Off. . |
| 200369 | 11/1986 | European Pat. Off. . |
| 2133671 | 12/1972 | France . |
| 2592828 | 7/1987 | France . |
| 878303 | 6/1953 | Germany . |
| 2839593 | 6/1979 | Germany . |
| 3138634 | 5/1983 | Germany . |
| 3401364 | 9/1984 | Germany . |
| 3425734 | 1/1985 | Germany . |
| 8706005 | 8/1986 | Germany . |
| 4221052 | 1/1994 | Germany . |
| 1206077 | 1/1986 | U.S.S.R. ................... 414/626 |
| 2021067 | 11/1979 | United Kingdom ....... 414/728 |
| 2099080 | 12/1982 | United Kingdom ....... 92/177 |

OTHER PUBLICATIONS

Patent Abstracts of Japan, vol. 6, No. 124 (M–141) (1002) Jul. 9, 1982 & JP-A-57 048 571 (Toray Engineering K.K.) Mar. 19, 1982.

*Primary Examiner*—James W. Keenan
*Attorney, Agent, or Firm*—Sughrue, Mion, Zinn, Macpeak & Seas

[57] ABSTRACT

Handling apparatus, in particular a telescopic cylinder having at least one retractable and extendable telescopic part. For handling objects, in particular bobbins of wound packaging material, in conjunction with packaging machines, use can be made of long-stroke telescopic members (10) which effect the automatic movement of a load-bearing pin for each bobbin. The telescopic members (10) can be extended by compressed air and can be drawn in by a tension member (20). The tension member (20) is arranged outside the telescopic member (10), is fixedly anchored by one end, and can be wound up and unwound by the other end. The tension member (20) runs over a deflection wheel (23) arranged at the free end of the telescopic member (10), namely on a piston rod (15) of the same.

14 Claims, 8 Drawing Sheets

HANDLING APPARATUS HAVING A RETRACTABLE AND EXTENDABLE TELESCOPIC PART

BACKGROUND OF THE INVENTION

The invention relates to a handling apparatus for objects, in particular bobbins of wound material webs, having at least one telescopic member comprising retractable and extendable telescopic parts, in particular telescopic cylinders, it being possible, in order to retract telescopic parts, to transmit at least a partial force onto the telescopic parts by means of a tension member.

Telescopic handling apparatuses are of increasing interest in packaging technology for the automatic handling of objects which are to be packaged, of packages or, in particular, of packaging material. The handling apparatuses, also called robots, have to permit movements of load-bearing members in various directions. The invention relates to such robots or to the most important elements of the same, namely the telescopic handling apparatuses.

A preferred application area for telescopic members of this type is constituted, in packaging technology, by apparatuses for handling wound webs of packaging material, that is to say bobbins. The latter are gripped on the outer circumference by a retaining means or in a central opening by a load-bearing pin. The movability of said retaining means is effected preferably by a plurality of separately controllable telescopic members. An example of such a handling apparatus is the subject matter of DE 42 21 052.6. In the case of this apparatus, three long-stroke pressure-medium cylinders, distributed in a star-shaped manner, are provided as retaining and actuating members for a load-bearing pin for receiving a bobbin of material. The present case is concerned with the special technical design of these pressure-medium cylinders, but also with telescopic members for other possible applications.

SUMMARY OF THE INVENTION

The object of the invention is to design telescopic handling apparatuses and the telescopic members thereof such that, along with the lightweight type of construction, long-stroke movements can be carried out with precise control of the movement procedures.

This object is achieved by the handling apparatus according to the invention, wherein an open-ended tension member is guided over a deflection member, in particular a deflection wheel, which is arranged in the region of a free end of a telescopic part, in particular a piston rod, and wherein a tensile force can be transmitted onto at least one end of the tension member in order to retract the telescopic part.

In the case of the telescopic member according to the invention, the extension movement is effected by a pressure medium, preferably by compressed air. The retraction movement of the telescopic part is effected predominantly or —advantageously—exclusively by a tension member which transmits a force onto the telescopic part with the effect of retracting the same.

The tension member is expediently a toothed belt, whose one end is anchored and whose other end can be wound up and unwound. The tension member is directed over a deflection means at the free, outer end of the (outer) telescopic part, in particular over a deflection wheel. The deflection means for the tension member is positioned centrally with respect to the longitudinal axis of the telescopic part.

In accordance with a further feature of the invention, the tension member is used to control the retraction and extension movements of the telescopic part. With the aid of the tension member, the precise position of the free end of the telescopic part, and thus the mode of operation of the entire handling apparatus, can be determined.

The invention further relates to the configuration of a multiple-part telescopic cylinder. The cylindrical telescopic parts, mounted one inside the other, comprise (thin-walled) aluminum tubes with head parts consisting of plastic. The telescopic cylinders, or the cylinder tubes thereof, are designed such that they are guided one inside the other such that they are secured with respect to rotation. For this purpose, the telescopic cylinders are each designed in a non-round manner on the inner side of their walls, in particular with flattenings which are distributed along the circumference and correspond with equivalently shaped, adjacent telescopic cylinders.

A plurality of, in particular three, telescopic members designed in the above manner form part of a handling apparatus which can be displaced "overhead" on a rail system by means of rollers or roller carriages. The telescopic members are distributed in a star-shaped manner on a load-bearing framework which is of special design and is connected to the roller carriages. Fitted on said load-bearing framework, according to the invention, are the units for generating compressed air and for controlling the telescopic members.

BRIEF DESCRIPTION OF THE DRAWINGS

Further details of the invention are illustrated hereinbelow with reference to exemplary embodiments represented in the drawings, in which.

DESCRIPTION OF PREFERRED EMBODIMENTS

The drawings show details of a handling apparatus which, in its simplest form, comprises a single telescopic member 10. For complex application areas, the handling apparatus exhibits a plurality of, in particular three, such telescopic members 10.

Figure 1:
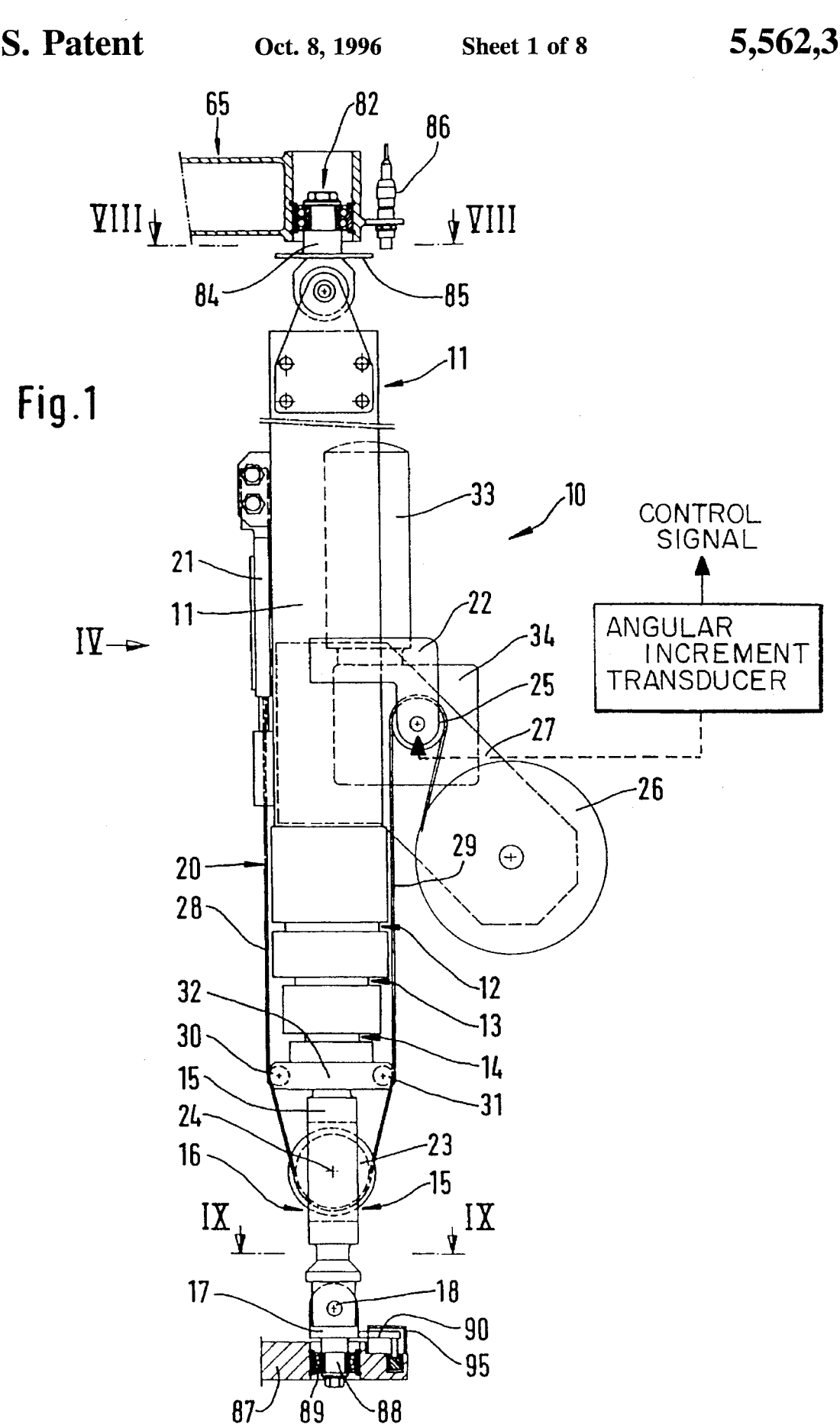
FIG. 1 shows a side view, partly in section, of a handling apparatus, namely a multiple-part telescopic member.

The telescopic member 10 according to FIG. 1 comprises a plurality of cylindrical telescopic parts, namely a basic cylinder 11, which is fixed or cannot be displaced in the axial direction, three displaceable telescopic cylinders 12, 13, 14 and a telescopic end part, namely a piston rod 15. The telescopic cylinders 12, 13, 14 can be displaced relative to one another and one inside the other. The piston rod 15 can be displaced in the (lower) telescopic cylinder 14.

Outside the telescopic cylinder 14, the piston rod 15 exhibits an end piece. An object which is to be moved or actuated can be fitted at the free end thereof. In the present case, this is a strap 17 which is connected to the end piece 16 via a bolt bearing 18 such that it can pivot (in one plane).

A pressure medium, namely compressed air, acts on the telescopic member 10 with the effect of extending the telescopic cylinders 12, 13, 14 and the piston rod 15. The compressed air is channelled into the basic cylinder 11 in the upper region. The compressed air may have a pressure of from 0.5 bar to 2 bar.

The opposite movement, namely the retraction movement of the telescopic parts, is effected by a tension member 20. In the present case, this is designed in the form of a belt or band. In specific terms, it is a toothed belt.

The tension member is fixed, with one end, by an anchorage piece 21. The latter is connected to the basic cylinder 11, to be precise in a lower region of the same.

The tension member 20 is directed over the end of the telescopic member 10, in the present case over the piston rod 15. In the region of the end piece 16, a deflection wheel 23 is mounted rotatably for this purpose. The end piece 16 is, for this purpose, designed in a double-walled manner in the region of the deflection wheel 23, or with two spaced-apart webs, between which the deflection wheel or roller 23 is fitted by means of a rotary bearing or pin 24. The position of the deflection wheel 23 is fixed such that the axis of the rotary bearing 24 lies precisely in a longitudinal central axis of the telescopic member 10, namely transversely with respect to the same. Consequently, the forces transmitted by the deflection wheel 23 onto the telescopic member 10, namely onto the piston rod 15, act precisely in the center, that is to say free of any offset.

The tension member 20 leads from the deflection wheel 23 to a further guidance and deflection member, namely a drive wheel 25. The latter is fastened in a stationary manner on the basic cylinder 11, at a clear distance from the deflection wheel 23, by means of a retaining means 22 designed in an angular manner. The drive wheel 25 is located approximately at the same level as the anchorage piece 21, but on the opposite side of the telescopic member 10.

The tension member 20 leads from the drive wheel 25 to a store, in the present case to a winding drum 26. One end of the tension member 20 is fastened on said winding drum 26. Depending on the position of the telescopic member 10, the winding drum 26 receives the free part of the tension member 20 by winding it up. For this purpose, the winding drum 26 is loaded in the winding-up direction, in particular by a spring (not shown). The winding drum 26 is also mounted in a stationary manner, namely on a load-bearing arm 27 connected to the basic cylinder 11. The winding drum 26 is located beneath the drive wheel 25, with the result that the tension member 20 loops around said drive wheel with an angle of approximately 180°.

In order to retract the telescopic parts of the telescopic member 10, the tension member 20 is drawn in, in the present case wound up. Consequently, a compressive force is transmitted, via the deflection wheel 23, onto the piston rod 15 and, thereafter, onto the further telescopic parts, namely telescopic cylinders 14, 13, 12. Upon retraction of the telescopic parts, a block-and-tackle effect is produced in terms of the force transmission A stroke of the telescopic member 10 of one cm corresponds to a retraction or wound length of the tension member 20 of 2 cm.

The tensile force is transmitted by the drive wheel 25. In the case of a tension member 20 designed as a toothed belt, teeth of the same are arranged such that the tension member 20 rests on the deflection wheel 23 with a smooth, tooth-free surface, but, in the region of the drive wheel 25, the teeth are in engagement with an equivalently shaped abutment surface of the drive wheel 25.

In the region of the telescopic member 10, the tension member 20 is guided such that strands 28, 29, subjected to tensile force, run on mutually opposite sides of the telescopic member 10, for the most part parallel to one another. For this purpose, the tension member 20 rests on supporting elements, in the present case on supporting rollers 30, 31, which are mounted at the ends of a transversely directed crossmember 32 connected to the piston rod 15 or the lower telescopic cylinder 14.

The drive wheel 25 is connected, for transmission purposes, to a motor 33. In the present case, an angular gear mechanism 34 is provided for this purpose, which gear mechanism, along with the motor 33 arranged there-above, permits a narrow, space-saving type of construction.

The tension member 20 permits precise control of the telescopic member 10 by precisely determining the extension length or the position of the tension member 20. For this purpose, an optoelectric measuring member, namely a rotary transducer or angular increment transducer FIG. 1, is arranged, in the case of the exemplary embodiment represented, in the region of the drive wheel 25. With reference to the revolutions of the drive wheel 25, said transducer determines the extension or retraction length of the tension member 20, and thus the precise extension position of the telescopic member 10. A control signal is derived, from the rotary transducer, for the retraction or extension movement of the telescopic member.

For the possible application areas of the telescopic member 10, it is of import that said member, on the one hand, exhibits a low dead weight, but, on the other hand, can be subjected to high loading, even in the case of comparatively long telescopic parts.

Figure 2:
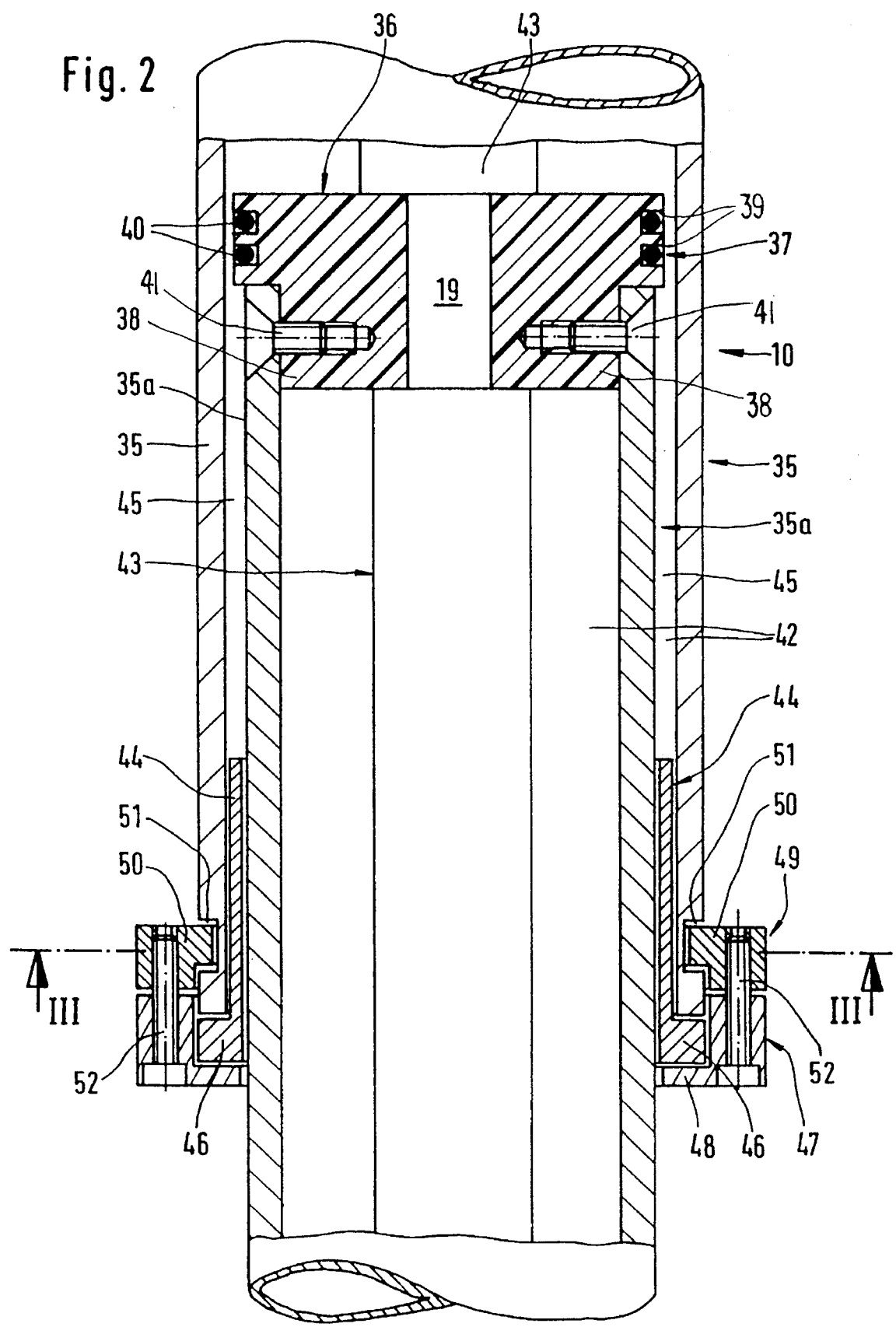
FIG. 2 shows a detail of the telescopic cylinder according to FIG. 1, namely portions of two cylindrical telescopic parts, in vertical section.

The telescopic cylinders 12, 13, 14, including the basic cylinder 11, thus advantageously comprise thin-walled cylinder tubes 35, 35a consisting of aluminum or a comparable suitable material. FIG. 2 shows, as a detail of a telescopic member 10, the lower end of an outer cylinder tube 35 and the upper region of an inner cylinder tube 35a. The upper end of the cylinder tube 35a is provided with a piston-like head piece 36 consisting of plastic, in particular polyester. This material has self-lubricating properties. The head piece 36 exhibits two portions, namely a sealing portion 37 at the respectively upper end, said portion being of a diameter which is slightly greater than the external diameter of the cylinder tube 35a, and a connecting portion 38. The external diameter of said connecting portion corresponds to the internal diameter of the cylinder tube 35a and serves for fastening on the same. An upper end piece of the cylinder tube 35a is seated on the connecting portion 38 such that it fits thereon. For fastening, use is made of radially directed fastening screws 41. The connection can be easily released for maintenance and repair purposes.

Two encircling grooves 39 are formed in the region of the sealing portion 37. Located in said groove is an elastic sealing means, in the present case an O-ring 40. The sealing of the inner telescopic cylinder with respect to the outer telescopic cylinder takes place in this region. The head piece 36 is provided with a (central) axial bore 19 which ensures the through-passage of the pressure medium (air) from one telescopic cylinder to the other.

Figure 3:
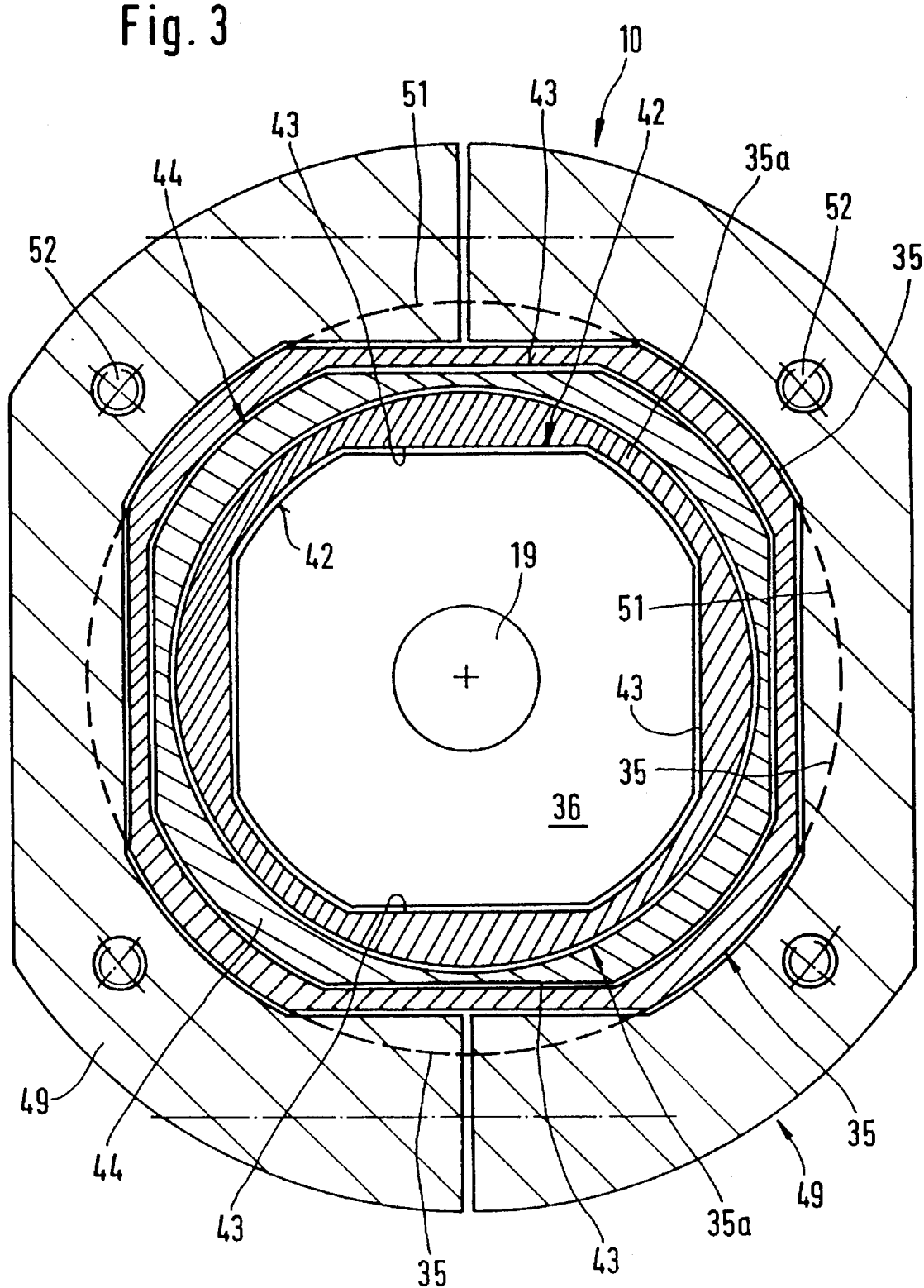
FIG. 3 shows a cross-section through a telescopic member in the plane III—III in FIG. 2.

The telescopic parts of the telescopic member 10, that is to say the telescopic cylinders 12, 13, 14, etc., are secured against relative rotation about their longitudinal axis. For this purpose, in the case of the present exemplary embodiment, the cylinder tubes 35, 35a are designed in a non-round manner on at least one side, in the present case on the inside in each case, with positively locking mutual positioning. As can be seen in FIG. 3, each cylinder tube 35, 35a is provided with flattenings 43 in the region of inner surfaces 42. In the present case, these are local thickenings of the cylinder tube 35, 35a, this resulting in planar surfaces, extending in the longitudinal direction and in the form of strips, as flattenings 43. Each cylinder tube 35, 35a is provided with four parallel surfaces or flattenings 43, located opposite one another in pairs, with the result that these cylinder tubes 35, 35a achieve an approximately octagonal cross-section.

The displaceable, smaller cylinder tube 35a, mounted in a cylinder tube 35, of the adjacent telescopic cylinder or of the piston rod 15 is mounted in a positively locking manner in the outer cylinder tube 35. For this purpose, the head piece 36 is cross-sectionally adapted, in the region of the sealing portion 37, to the cross-sectional form of the outer cylinder tube 35. The head piece 36 can thus be displaced in the longitudinal direction, but is mounted, in the circumferential direction, in a positively locking manner in the cylinder tube 35.

An interior telescopic part or an interior cylinder tube 35a (or the piston rod 15) is retained in the lower or free end region of the next following outer cylinder tube 35 by a separate supporting member, namely by a bearing bush 44. This is located within an (approximately) cylindrical gap 45 between the adjacent cylinder tubes 35, 35a. The bearing bush 44, preferably consisting of plastic, is designed with a cylindrical inner surface, corresponding to the outer contour of the inner cylinder tube 35, 35a. An outer surface is designed in a non-round or octagonal manner, corresponding to the inner contour of the outer cylinder tube 35. The outer cylinder tube 35 is thus supported in a positively locking manner on the bearing bush 44.

In the lower region of the outer cylinder tube 35, the bearing bush 44 is mounted such that it cannot be displaced in the axial direction. For this purpose, an outwardly directed flange 46 is fitted at the free or lower end of the bearing bush 44. Said flange extends beneath, or outside, the free end of the outer cylinder tube 35. The bearing bush 44 is retained by an encircling supporting ring 47 which exhibits an inwardly directed web 48. The bearing bush 44 rests on said web by means of the flange 46.

The supporting ring 47 is retained by a bracing ring 49. In the present case, said bracing ring is divided; it comprises two bracing-ring halves (FIG. 3). The bracing ring 49 enters, by means of protrusions 50, into retaining grooves 51 on the outer side of the outer cylinder tube 35. The retaining grooves 51 are merely part-grooves with the contour of a portion of the surface of a circle. Four such retaining grooves 51 are distributed along the circumference of the outer cylinder tube 35. In this region, the bracing ring 49, designed with a circular inner contour, is fixed on the cylinder tube 35 with respect to displacements in the axial direction.

Supporting ring 47 and bracing ring 49 are releasably connected to one another by a plurality of screws 52 distributed along the circumference.

The open-ended tension member 20 permits automatic monitoring of extreme operating conditions. For this purpose, the stressing in the tensile member 20 can be measured.

Figure 4:
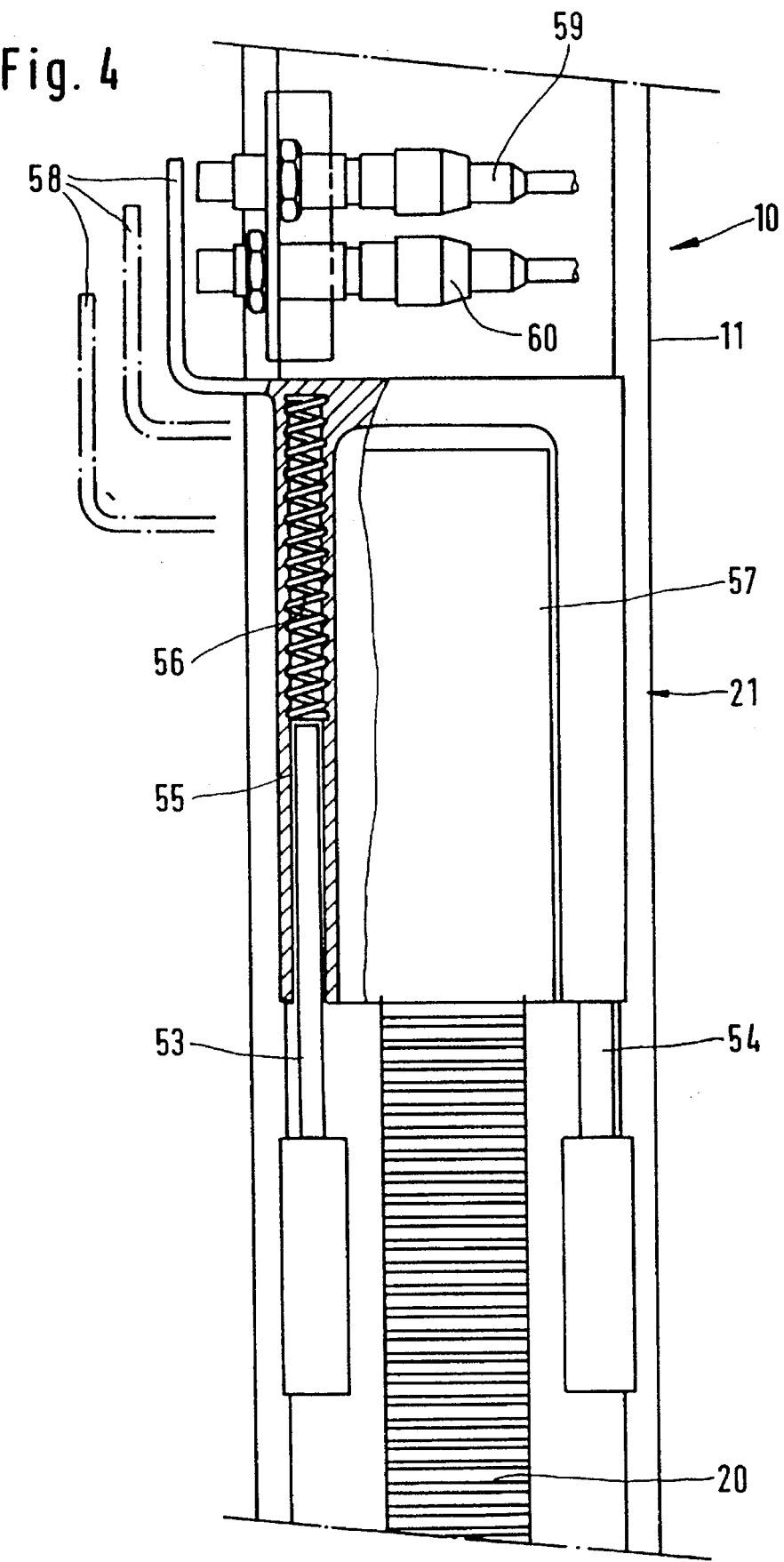
FIG. 4 shows, on an enlarged scale, a detail in the upper region of a telescopic member according to FIG. 1, partly in section.

As can be seen in FIG. 4, the end of the tension member is anchored in an elastic manner for this purpose, to be precise by the elastic displaceability of the anchorage piece 21. The latter is designed as a carriage and can be slidingly displaced on (two) guide rods 53, 54 when a change in the tensile force in the tension member 20 occurs. The guide rods 53, 54 are fixedly mounted and project into matching bores 55 of the anchorage piece 21. A compression spring 56 in the form of a helical spring is located in an extension region in each of the bores 55. In the case of any displacement of the anchorage piece 21, said spring, as a result of increased loading in the tension member 20, is compressed by the associated guide rod 53, 54. When the tension member 20 is relieved, the anchorage piece 21 returns automatically into the starting position. The end of the tension member 20 is connected to the anchorage piece 21 by a connecting plate 57.

The relative position of the anchorage piece 21 is monitored. In extreme positions, a control signal is generated, said signal stopping, in particular, the drive for the motor 33.

In the case of the present exemplary embodiment, a sensing lug 58 is fitted laterally on the movable anchorage piece 21. Said sensing lug acts together with stationary, contactless sensing members, namely initiators 59 and 60. The latter are positioned at intervals one after the other in the movement direction of the sensing lug 58.

In an upper position (shown by a solid line in FIG. 4), of the sensing lug 58, both initiators 59, 60 are acted upon. In this position, the tension member 20 is fully relieved of stressing. The handling apparatus is switched off. In a central position, only one initiator 60 is acted upon by the sensing lug 58. This corresponds to the normal operating state of the handling apparatus with corresponding stressing in the tension member 20. If said stressing increases in an undesired manner to such an extent that the sensing lug 58 is moved, by the anchorage piece 21, into the lower position, said lug passes out of the region of the two initiators 59, 60. A control signal may also be derived from this, with the effect of switching off.

The abovedescribed telescopic member 10 is part of a complex handling apparatus, in particular for handling and for transporting bobbins of wound material webs (packaging material). Bobbins of this type are usually provided with a central opening. A transporting pin 61 enters into said opening. The transporting pin 61 is anchored within the central opening of the bobbin (not shown) such that any relative position is possible during transportation without the bobbin sliding from the transporting pin 61.

Figure 5:
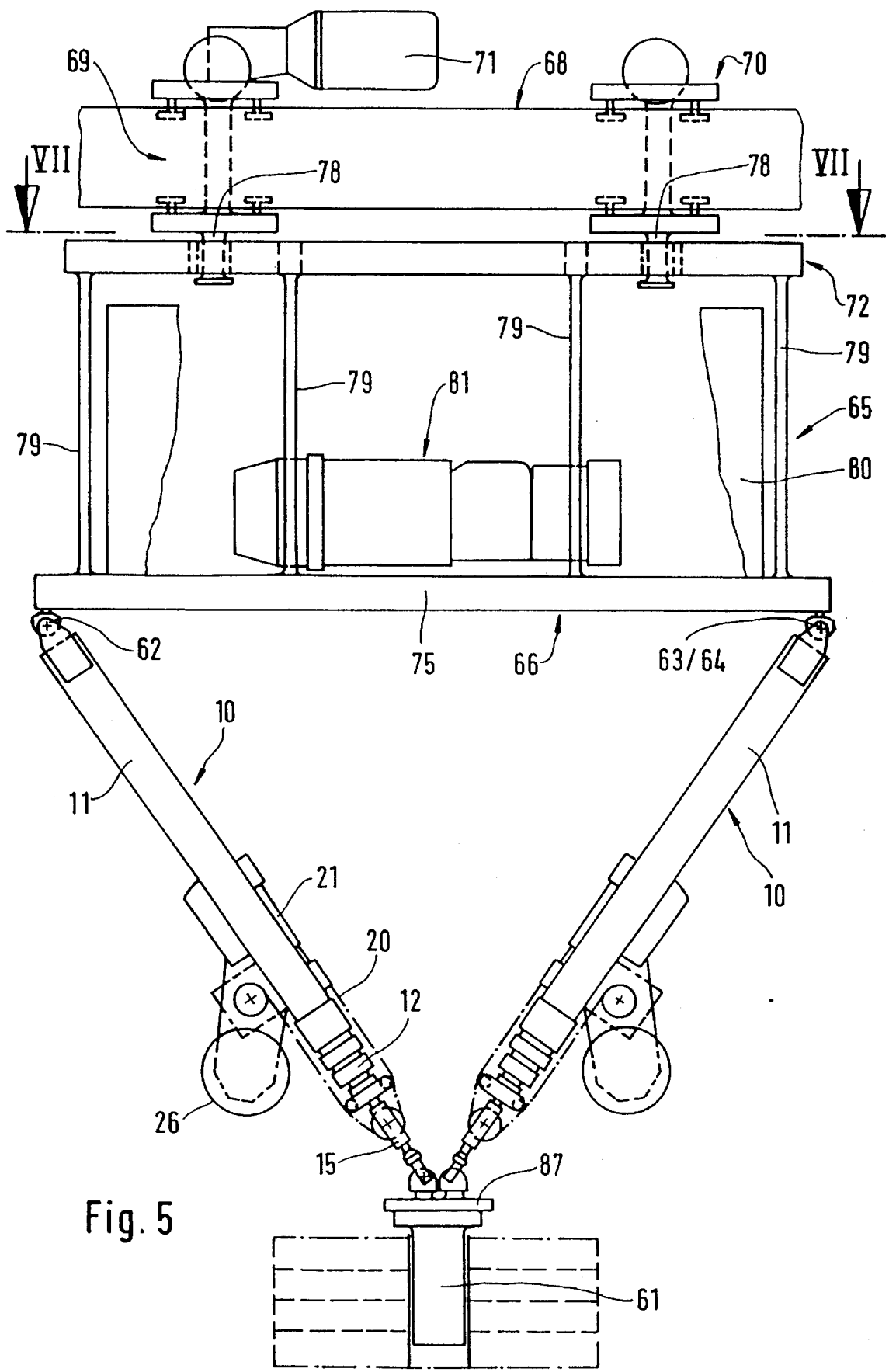
FIG. 5 shows a side view of a displaceable handling apparatus which comprises a plurality of telescopic members.
Figure 6:
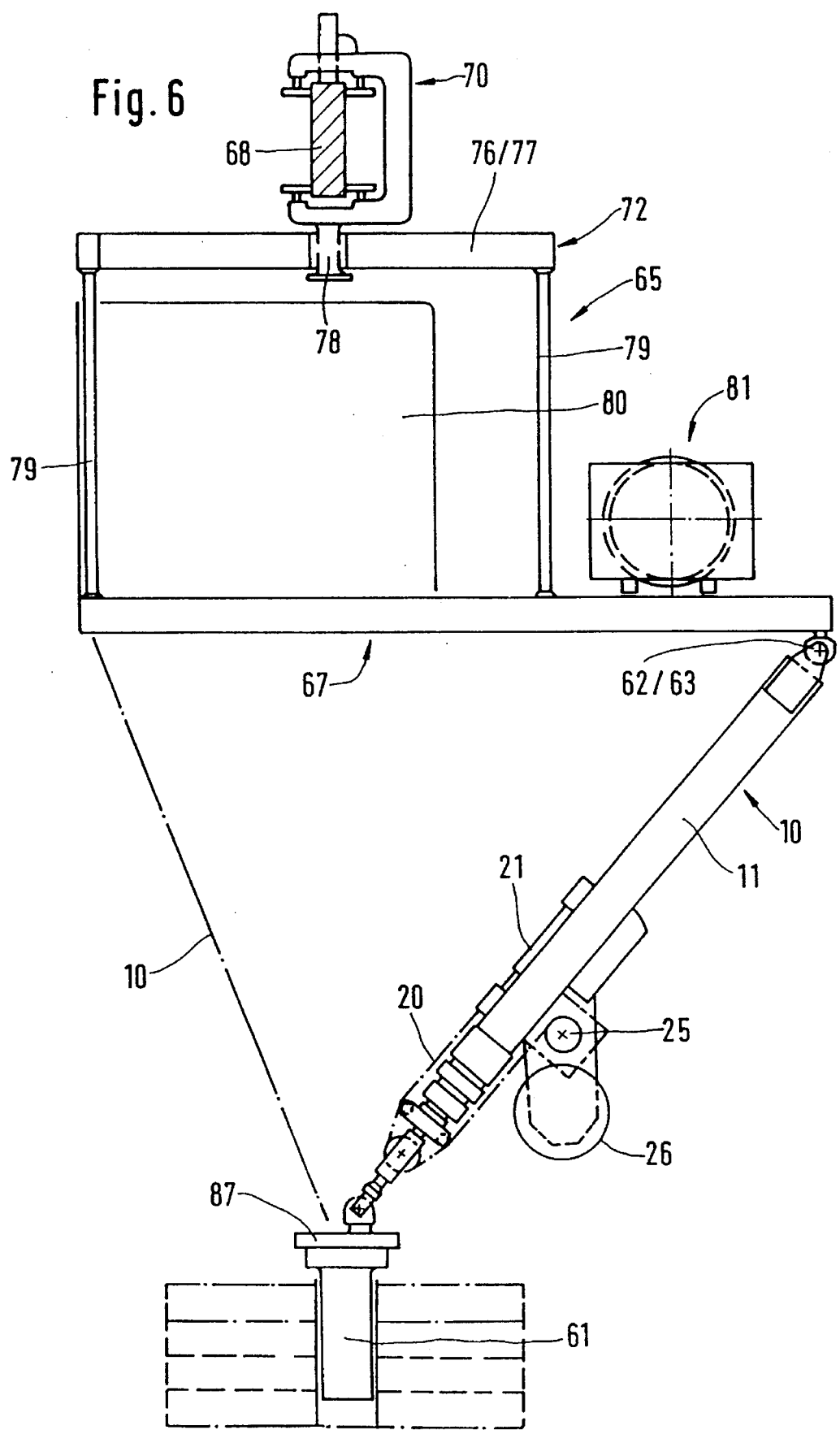
FIG. 6 shows the handling apparatus according to FIG. 5 in a transverse view, offset through 90°, with respect to FIG. 5.
Figure 7:
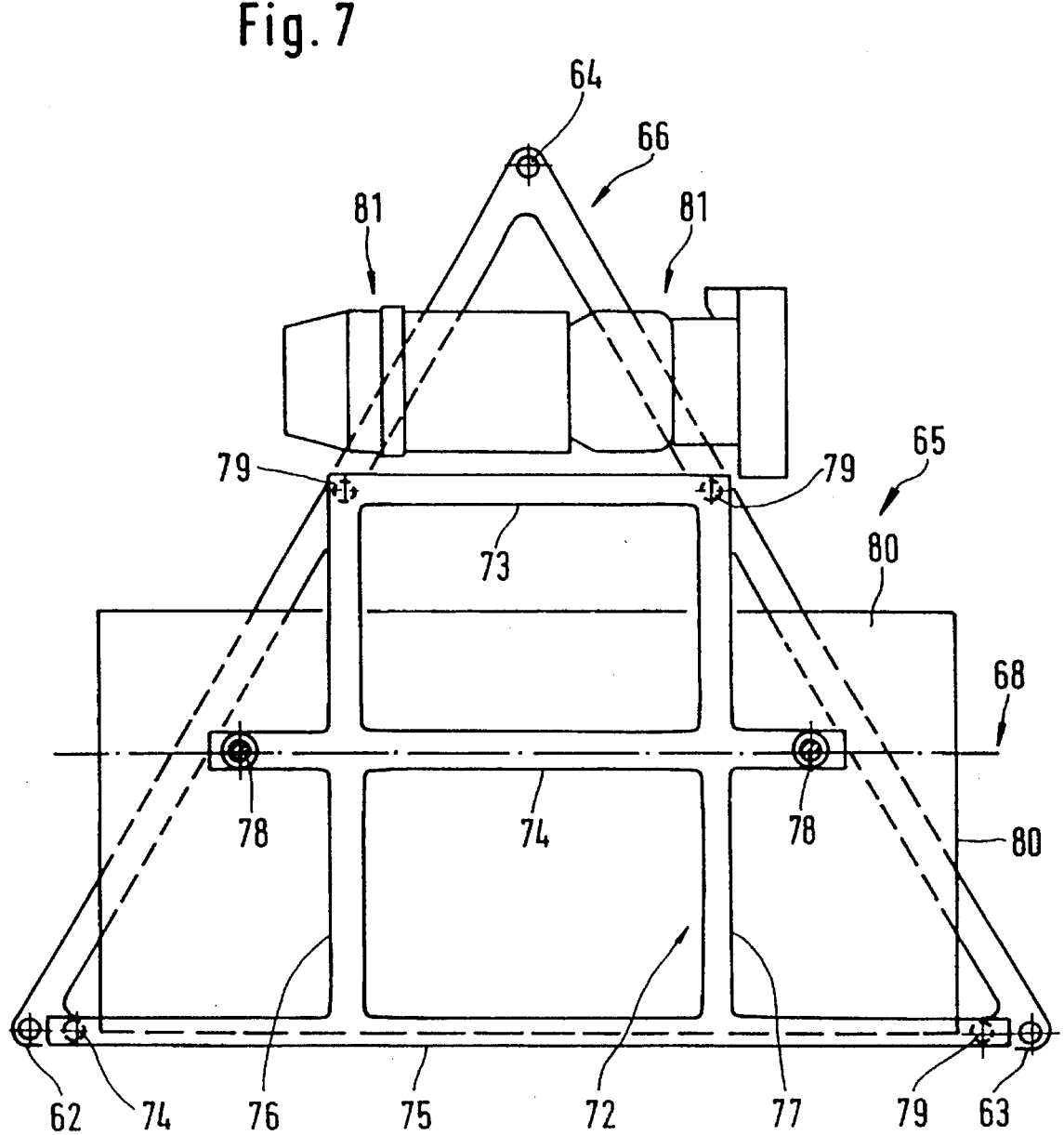
FIG. 7 shows a plan view of a load-bearing framework of the handling apparatus according to FIGS. 5 and 6.

The handling apparatus according to FIG. 5 et seq. is provided with three telescopic members 10 which are positioned in a star-shaped manner. Said members are arranged in a position converging downwards or in the direction of the transporting pin 61. Upper connecting articulations 62, 63, 64 are fitted, at the same mutual spacings, on a load-bearing framework 65 or beneath the same.

The immediate carrier for the telescopic members 10 is a load-bearing frame 66 which, here, extends in the horizontal plane. The load-bearing frame 66 comprises carriers 67 which are connected to one another to form an (equilateral) triangle. In each case one telescopic member 10 is mounted at the corner points of the triangular load-bearing frame 66.

In the case of the exemplary embodiment in FIG. 5 et seq., the load-bearing frame is connected to a travelling mechanism which permits displaceability of the handling apparatus along a load-bearing rail 68. This is an "overhead" conveying system which is arranged above packaging machines or the like.

Assigned to the handling apparatus are two running units 69, 70, of which the running mechanism 69 is driven by an electric motor 71.

The load-bearing frame 66 forms the lower part of the load-bearing framework 65. An upper connecting frame 72, which extends—just as the load-bearing frame 66—in the horizontal plane, serves to connect the load-bearing framework 65 to the running mechanisms 69, 70. The connecting frame 72 comprises longitudinal carriers 73, 74, 75 and transverse carriers 76, 77. The central longitudinal carrier 74 extends in the central plane of the load-bearing rail 68. The longitudinal carriers 73 and 75 are arranged parallel thereto, at the same distances from the longitudinal carrier 74. The running mechanisms 69, 70 are connected to the ends of the longitudinal carrier 74 via load-bearing pins 78. Upright struts 79, at the ends of the longitudinal carriers 73 and 75 in each case, connect the upper connecting frame 72 to the load-bearing frame 66 located therebeneath.

In the present case, the load-bearing framework 65 serves to receive operating and control members. Located between load-bearing frame 66 and connecting frame 72 is a complete control unit 80 for controlling the handling apparatus, namely the telescopic members 10. Furthermore, the load-bearing framework 65 accommodates a compressed-air unit 81 with motor and compressor for generating the compressed air for operating the telescopic members. The abovementioned units are arranged on the upper side of the load-bearing frame 66, and are thus displaced with the complete unit of the handling apparatus.

For a disruption-free mode of operation of the telescopic members 10, further measures are taken. It is thus ensured that the rotatability of the telescopic members 10 about an upper rotary bearing 82 with vertical rotary axis is restricted. The relevant rotary bearing 82 is located in the load-bearing frame 66. Said rotary bearing is a ball bearing.

Figure 8:
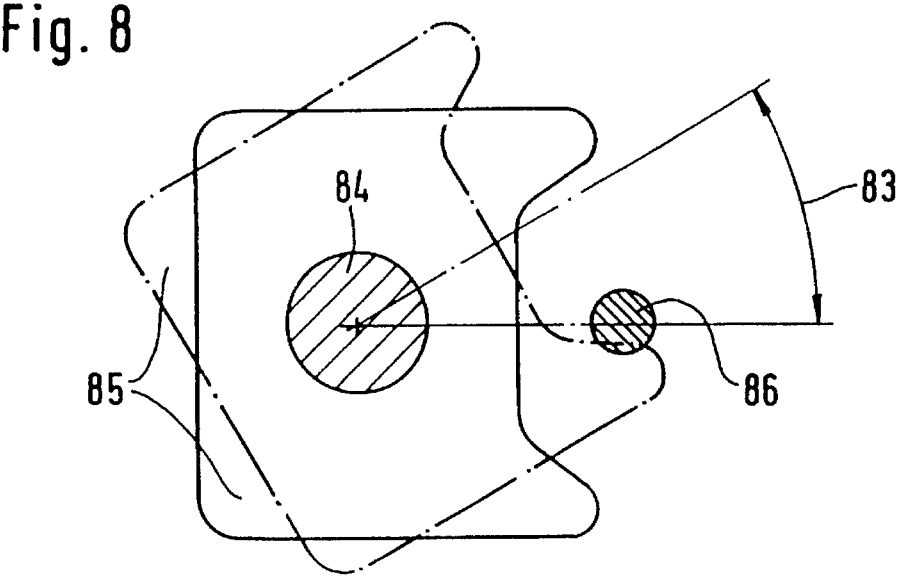
FIG. 8 shows a detail of the telescopic member according to FIG. 1, namely a cross-section in the plane VIII—VIII in FIG. 1.

The telescopic member 10 can rotate through an angle 83 (FIG. 8) to both sides, about a vertical axis of the rotary bearing 82. The end positions are monitored by sensing members in each case. A load-bearing pin 84 assigned to the rotary bearing 82 bears a transversely directed sensing disk 85. This acts together with a contactless sensing member, namely an initiator 86, which is fixedly fitted, namely on the load-bearing frame 66. By virtue of the shape of the sensing disk 85, the end position of the telescopic member 10 is restricted in a contactless manner in terms of the rotary movement.

Figure 9:
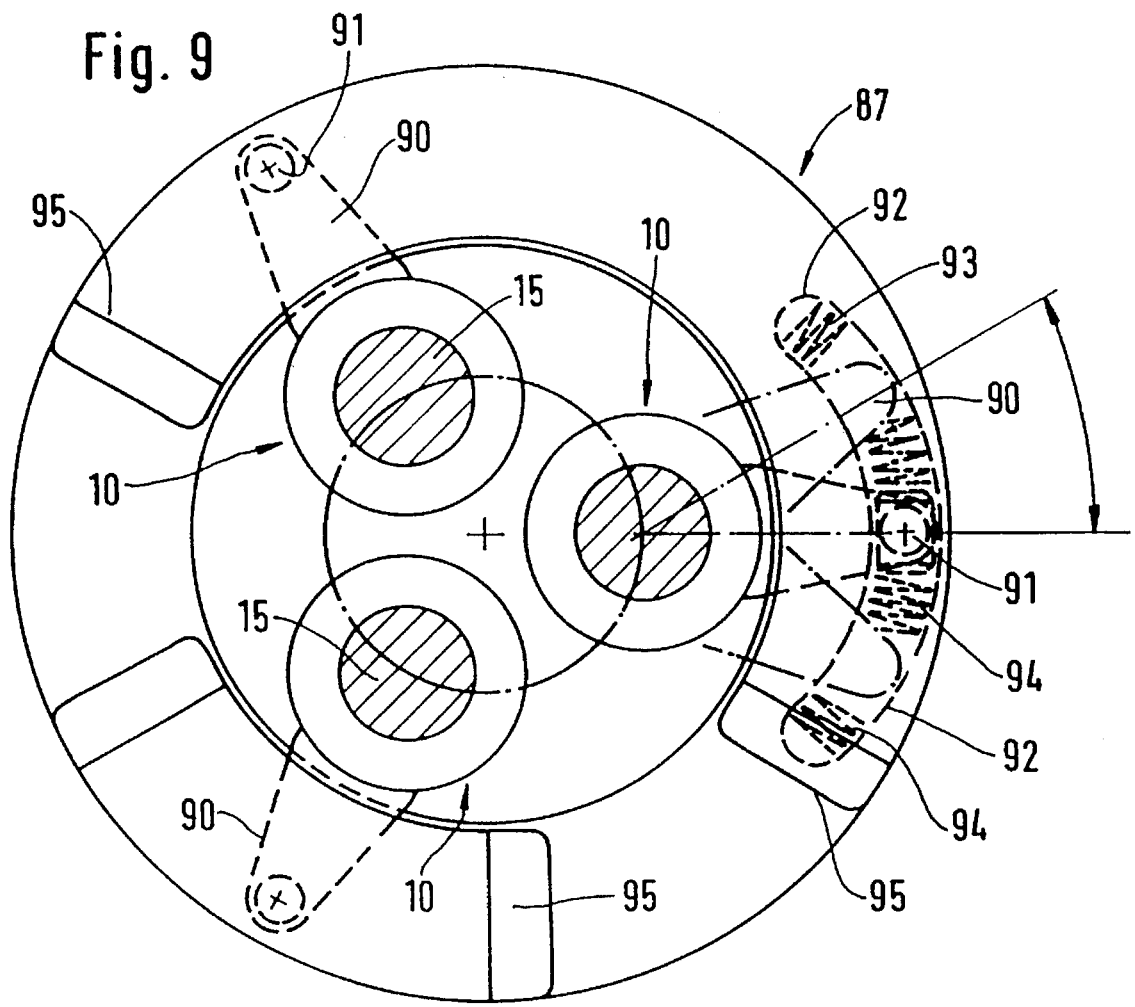
FIG. 9 shows a cross-section with plan view in the plane IX—IX in FIG. 1.

Furthermore, it is provided that a restoring force acts on the (three) telescopic members 10 of the handling apparatus, on a central, centric starting position. As can be seen, in particular, in FIG. 9, the lower ends of the telescopic members 10 are connected to a common retaining member, namely a transversely directed load-bearing disk 87. In this, the telescopic members 10 are mounted, by means of a downwardly directed load-bearing bolt 88 connected to the strap 17, such that they can rotate, namely about a vertical axis. Three rotary bearings 89 arranged at the same circumferential spacings from one another are thus formed in the load-bearing disk 87.

Restoring forces are exerted on the telescopic members 10 with the effect of rotation. For this purpose, a transversely projecting supporting arm 90 is fitted on each telescopic member 10. In the present case, said supporting arm is connected to the strap 17. Fitted at the free end of the supporting arm 90 is a downwardly directed guide-slot piece 91 which is guided in an arcuate guide slot or a groove 92 of the load-bearing disk 87. The guide-slot piece 91 is resiliently acted upon, within the groove 92, on both sides, namely by compression springs 93, 94.

When, during operation of the handling apparatus, as a result of different and/or angular positions of the telescopic members 10, the latter carry out rotary movements about the vertical axis, the guide-slot piece 91 is displaced, within the groove 92, in one or the other direction counter to the loading of the compression spring 93 or 94. When the loading of the telescopic members 10 is eliminated, the guide-slot piece 91 is returned into the central position by the compression springs 93, 94. This corresponds also to a central position of the telescopic members 10.

The abovedescribed members, in particular the grooves 92, are covered on the upper side of the load-bearing disk 87 by a covering cap 95.

What is claimed is:

1. A handling apparatus for objects, said apparatus having at least one telescopic member (10) comprising an upper base cylinder (11), a plurality of retractable and extendible, pressure-medium operated telescopic cylinders (12, 13, 14), and a likewise retractable and extendible pressure-medium operated piston rod (15) which is guided in a lower most one (14) of said telescopic cylinders, said apparatus further comprising:

a) a tension member (20) for retracting said telescopic member (10), and being guided over a deflection roller (23) mounted on said piston rod (15);

b) a winding drum on which said tension member is windable;

c) means (21) for anchoring one end of said tension member (20), an opposite end of said tension member (20) being windable on, and unwindable off, said winding drum (26), d) said anchoring means directly attaching said one end of the tension member (20) to an outside of said upper base cylinder (11); and e) means for attaching said winding drum (26) to said outside of said cylinder at a point thereof which is diametrically opposite the attached one end of said tension member (20).

2. The handling apparatus as claimed in claim 1, wherein said tension member (20) is a toothed belt.

3. The handling apparatus as claimed in claim 1, wherein the tension member (20) forms two approximately parallel strands (28, 29) extending along opposite sides of said telescopic member (10), said apparatus further comprising supporting rollers (30, 31), mounted on said opposite sides of said telescopic member (10) for supporting said strands.

4. The handling apparatus as claimed in claim 1, further comprising a deflection wheel (25) around which said tension member (20) is wound, an angular increment transducer for measuring an extension length of the telescopic member (10) or a relative position thereof with reference to an extraction and extension length of the tension member (20), by measuring the extended or retracted length of the tension member (20) with reference to rotations of said deflection wheel (25), and wherein the telescopic member is controllable by a control signal generated by said angular increment transducer in response to the length measured thereby.

5. The handling apparatus as claimed in claim 1, wherein said anchoring means comprises an elastic anchorage piece (21) for elastically anchoring said one end of the tension member (20), said anchorage piece (21) being displaceable counter to a force provided by a spring (56), said apparatus further comprising a plurality of measuring members (58) for sensing relative positions of the anchorage piece (21) in accordance with tensile stressing in said tension member (20), and being mounted on said anchorage piece (21).

6. The handling apparatus as claimed in claim 1, further comprising a transversely directed rotary pin (24) on which said deflection roller (23) is mounted in an end piece (16) of said piston rod (15) and centrally with respect to an imaginary longitudinal central axis of said telescopic member (10).

7. The handling apparatus as claimed in claim 1,
   a) wherein said telescopic cylinders (11, 12, 13) are guided non-rotatably, one inside the other, by mutually corresponding shapes of the telescopic cylinders,
   b) wherein adjacent ones of said telescopic cylinders (12, 13, 14) comprise inner and outer cylinder tubes (35, 36a) having on inner (42) and outer surfaces thereof flattenings (43) which form said mutually corresponding shapes,
   c) wherein each outer cylinder tube (35) is supported, in a lower free end thereof, on the inner cylinder tube (35a) by a bearing bush (44) located between two adjacent cylinder tubes (35, 35a), and
   d) wherein each bearing bush (44) has a contour which corresponds to the shape of the respective abutting cylinder tube (35, 35a), whereby the bearing bush (44) is provided with an outer surface or an inner surface which exhibits flattenings corresponding to those of the cylinder tubes (43).

8. A handling apparatus for objects, and having at least one telescopic member (10) comprising retractable and extendible telescopic cylinders, and a tension member (20) for transmitting at least a partial force to the telescopic cylinders,
   a) wherein said telescopic cylinders (12, 13, 14) are guided non-rotatably, one inside the other, by mutually corresponding shapes of the telescopic cylinders,
   b) wherein adjacent ones of said telescopic cylinders (12, 13, 14) comprise inner and outer cylinder tubes (35, 36a) having on inner and outer surfaces thereof flattenings (43) which tom said mutually corresponding shapes,
   c) wherein each outer cylinder tube (35) is supported, in a lower free end thereof, on the inner cylinder tube (35a) by a bearing bush (44) located between the two adjacent cylinder tubes (35, 35a), and
   d) wherein each bearing bush (44) has a contour which corresponds to the shape of the respective abutting cylinder tube (35, 35a), whereby the bearing bush (44) is provided with an outer surface or an inner surface which exhibits flattenings corresponding to those of the cylinder tube (43).

9. The handling apparatus as claimed in claim 8, wherein the inner surface (42) of each cylinder tube (35, 35a) has four flattenings (43) distributed uniformly along a circumference of said each cylinder tube.

10. The handling apparatus as claimed in claim 8 or 9, wherein each telescopic cylinder (12, 13, 14) has, at the upper end thereof, a head piece (36), in the form of a plastic piston, which is anchored in said each cylinder tube (35, 35a) by a connecting portion (38) having a first diameter and resting, in a sliding and positively locking manner, on the inner surface (42) of the outer cylinder tube (35) via a sealing portion (37) of greater diameter than said first diameter.

11. The handling apparatus as claimed in claim 8, comprising three telescopic members (10) having free ends (15) that are connected in an articulated manner to a common load-bearing disk (87), and wherein a transporting pin (61) for retaining bobbins is fitted on a free lower side of the load-bearing disk (87).

12. The handling apparatus as claimed in claim 11, further comprising compression springs (93, 94), located in a groove (92) of the load-bearing disk (87), for producing an elastic restoring force which acts on the telescopic members (10) in a direction of a central position.

13. The handling apparatus as claimed in claim 11, further comprising a plurality of contactless sensing members (86), interacting with a sensing disk (85) fitted on an upper region of each telescopic member (10), for restricting and monitoring a rotary range of each telescopic member about a longitudinal axis thereof.

14. The handling apparatus as claimed in claim 11, wherein said telescopic members are fitted, by upper ends thereof, in an articulated manner on a load-bearing framework (65) which comprises a lower horizontal load-bearing frame (66) and an upper connecting frame (72) that is connected to running mechanisms (69, 70) of a load-bearing rail (68) and, via upright struts (79), to said load-bearing frame (66).

\* \* \* \* \*